United States Patent
Watanabe et al.

[11] Patent Number: 5,886,482
[45] Date of Patent: Mar. 23, 1999

[54] DISPLAY DEVICE WITH DYNAMIC FOCUS CIRCUIT

[75] Inventors: Toshimitsu Watanabe, Yokohama; Masahisa Tsukahara, Fujisawa; Makoto Kitamura; Takeshi Mochizuki, both of Yokohama, all of Japan

[73] Assignees: Hitachi, Ltd., Tokyo; Hitachi Video and Information Systems, Inc., Yokohama, both of Japan

[21] Appl. No.: 944,491

[22] Filed: Oct. 6, 1997

[30] Foreign Application Priority Data

Oct. 7, 1996 [JP] Japan .................................... 8-265735

[51] Int. Cl.⁶ .............................. H04N 3/26; H01J 29/58
[52] U.S. Cl. ........................ 315/382.1; 315/382; 348/806
[58] Field of Search ............................. 348/806; 315/382, 315/382.1

[56] References Cited

U.S. PATENT DOCUMENTS

| | | | |
|---|---|---|---|
| 4,891,564 | 1/1990 | Crowley | 315/382 |
| 5,036,259 | 7/1991 | Sutton et al. | 315/382 |
| 5,146,142 | 9/1992 | Van Tol | 315/382 |
| 5,430,358 | 7/1995 | George | 315/382 |
| 5,434,485 | 7/1995 | Kawashima et al. | 315/382.1 |
| 5,455,492 | 10/1995 | Turnbull | 315/382 |
| 5,463,288 | 10/1995 | George et al. | 315/382 |
| 5,705,900 | 1/1998 | Hwang | 315/382 |

FOREIGN PATENT DOCUMENTS

| | | | |
|---|---|---|---|
| 54-155721 | 12/1979 | Japan . | |
| 62-188568 | 8/1987 | Japan . | |
| 2-309869 | 12/1990 | Japan . | |
| 6-090376 | 3/1994 | Japan | H04N 3/26 |
| 6-350865 | 12/1994 | Japan | H04N 3/26 |

*Primary Examiner*—Edward P. Westin
*Assistant Examiner*—Shane R Gardner
*Attorney, Agent, or Firm*—Antonelli, Terry, Stout & Kraus, LLP

[57] ABSTRACT

A display device for suppressing focus dislocation due to high voltage fluctuation and realizing a dynamic focus circuit with large output at low power consumption and low cost, in which a circuit for detecting high voltage fluctuation is provided, and the dynamic focus waveform is clamped, and the waveform of horizontal cycle is clipped during the retrace time, and a boot strap circuit including an emitter follower, DC feedback circuit, and capacitor is provided as an output circuit.

5 Claims, 7 Drawing Sheets

1 ⋯ DYNAMIC FOCUS CIRCUIT

16 ⋯ DYNAMIC FOCUS CIRCUIT

DISPLAY DEVICE WITH DYNAMIC FOCUS CIRCUIT

BACKGROUND OF THE INVENTION

1. Field of the Invention

The present invention relates to a display device having a dynamic focus voltage circuit and particularly to a display device suitable for a TV set with a large screen size, a display device of cathode ray tube for a wide angle deflection, and a display device of cathode ray tube with a thick neck diameter.

2. Description of the Prior Art

Generally in a cathode ray tube to be used for a TV set and others, the arrival distance of electron beam is different between the center position of the screen and the corner position thereof, so that even if the TV set is adjusted so as to obtain a best focus in the center position of the screen, the focus in the corner position becomes dull as it is. Therefore, the focus is corrected by applying a voltage to the focus electrode of the cathode ray tube according to the deflection position of electron beam by the dynamic focus voltage circuit and the electron beam is kept in the best focusing state overall the screen. A prior art relating to such a dynamic focus device is described in Japanese Patent Application Laid-Open 54- 155721.

Since the screen of each display is becoming larger and the brightness thereof is increasing recently, a request to a dynamic focus circuit is becoming severe.

As a first problem, it is necessary to make this dynamic focus voltage extremely high due to a wide angle deflection of the cathode ray tube and a large diameter of the electron gun.

As a second problem, since a large mean beam current is set so as to realize a high brightness, a high voltage dynamic regulation occurs, and the focus voltage for the high voltage relatively fluctuates, and the best focusing state cannot be maintained. The second problem will be explained briefly by referring to FIG. 6. FIG. 6(a) shows the status of a white band pattern displayed on the screen. In the portion equivalent to the white band on the screen, the signal amplitude of the signal waveform shown in (b) is large. In correspondence with it, in the portion of white band of the high voltage waveform shown in (c), nearly ½ of the vertical cycle is required for the high voltage to drop and recover to the predetermined value. However, the voltage waveform at the focus terminal is not so large unlike the change in the high voltage as shown in (d), and the electron gun enters the overfocusing state, and the focus reduces over a wide area from the white window portion to the lower part of the screen.

To solve the first problem, a method of generating a high voltage using a boosting transformer and a method of generating a high voltage using active elements such as a high voltage supply and a transistor are used. Each of them has its merits and demerits and the problems indicated below are imposed.

(1) A case of a boosting system using a transformer

When the boosting ratio of a transformer is set high, a sufficient voltage amplitude is obtained. However, since the core size of the transformer is increased, there are disadvantages such that the area of the board is required to increase and the materials of the transformer are expensive.

(2) A case that an active element such as a transistor is used

To obtain a high voltage amplitude, it is necessary to increase the supply voltage, increase the withstand voltage of the active element, and reduce the load resistance so as to preserve the slewing rate. As a result, there are disadvantages such that the power consumption of the whole circuits increases extremely, and the area of the board increases because a heat radiation board is required, and the materials are expensive including high withstand voltage elements.

For the second problem, it is necessary to suppress a dynamic regulation in the high voltage. For example, it is necessary to use a high voltage stabilizing circuit and a deflection high voltage separation system. However, in both cases, a problem arises that the number of parts increases and the materials are expensive.

SUMMARY OF THE INVENTION

An object of the present invention is to realize an inexpensive dynamic focus circuit for generating a voltage having a large amplitude with a brief constitution without increasing the power consumption of the dynamic focus circuit and always maintaining a best focusing state for high voltage fluctuation.

To accomplish the above object, the display device of the present invention comprises a deflection device for generating a magnetic field for deflecting an electron beam in the horizontal or vertical direction, a cathode ray tube device having a terminal for controlling a focusing electric field for focusing an electron beam, a high voltage circuit for supplying a high voltage to the cathode ray tube device, a dynamic focus circuit for controlling a focusing electric field according to the deflection position of an electron beam, a means for detecting a high voltage dynamic regulation of the high voltage circuit and creating a high voltage dynamic regulation detection waveform, a circuit for generating a waveform of horizontal cycle in the dynamic focus circuit, a first amplifier for amplifying the waveform of horizontal cycle, a circuit for generating a waveform of vertical cycle, an adder for synthesizing the waveform of vertical cycle and the high voltage dynamic regulation detection waveform, a second amplifier for amplifying the waveform of the adder, and a circuit for clamping the waveform of the first amplifier with the waveform of the second amplifier.

Indicating more concretely, for the first problem, the present invention uses an active element and uses the technical means indicated below as a constitution obtaining a dynamic focus voltage with a large amplitude.

(1) The dynamic focus correction waveform is clipped during the retrace time with no electron beam scanned.

(2) The load resistance of the output circuit is set large, and an emitter follower is used together, and the power loss of the element is suppressed.

(3) To preserve the slewing rate, a boot strap circuit is applied.

For the second problem, the present invention uses the technical means indicated below as a constitution providing a circuit for controlling the voltage at the focus terminal of the cathode ray tube in correspondence with high voltage fluctuation.

(4) A detector for detecting voltage fluctuation at the high voltage terminal is provided.

(5) High voltage fluctuation is amplified and added to the focus terminal.

(6) The addition means to the focus terminal uses a system for clamping a signal of the amplifier for realizing the first problem with a signal of the amplifier for realizing the second problem.

By use of the aforementioned means, for example, if the supply voltages of the amplifiers for realizing the first and second problems are about 1000 Vpp and the voltage amplitudes of the respective outputs are about 900 Vpp and 500 Vpp, an extremely large voltage amplitude of 1400 Vpp is obtained at the focus terminal.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Figure 1:
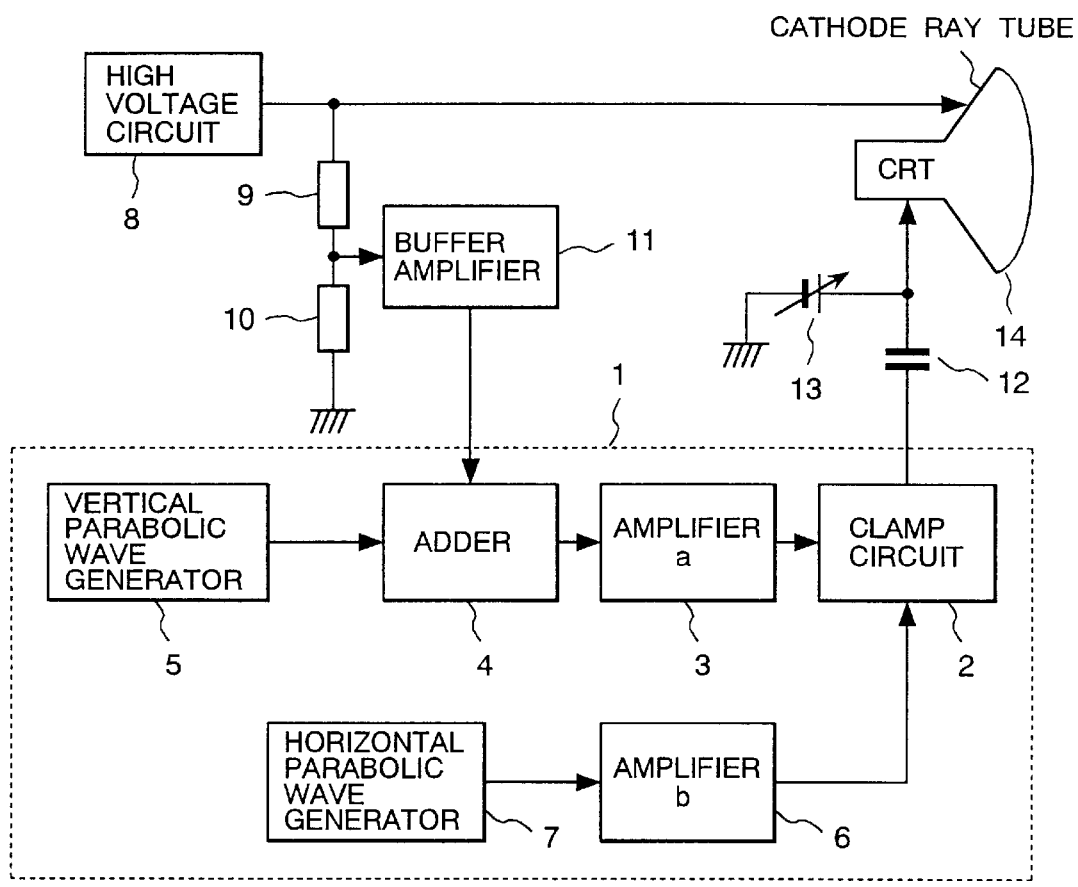
FIG. 1 is a block diagram showing a display device which is a first embodiment of the present invention.

The first embodiment of the present invention will be explained hereunder by referring to FIG. 1. FIG. 1 is a drawing showing an example that the present invention is applied to a display device of a cathode ray tube.

A dynamic focus circuit 1 comprises a clamp circuit 2, an amplifier A 3, an adder 4, a vertical parabolic wave generator 5, an amplifier B 6, and a horizontal parabolic wave generator 7. The output of the dynamic focus circuit 1 is supplied to a DC voltage circuit 13 connected to the focus electrode of a cathode ray tube (CRT) 14 via a coupling capacitor 12 and the voltage of a high voltage circuit 8 connected to the anode terminal of the cathode ray tube 14 is divided by voltage dividing elements (for example, resistors) 9 and 10, converted to a signal via a buffer amplifier 11, and added to a signal of the vertical parabolic wave generator 5 by the adder. An electron beam can be focused best at all positions on the screen of the cathode ray tube 14.

Figure 2:
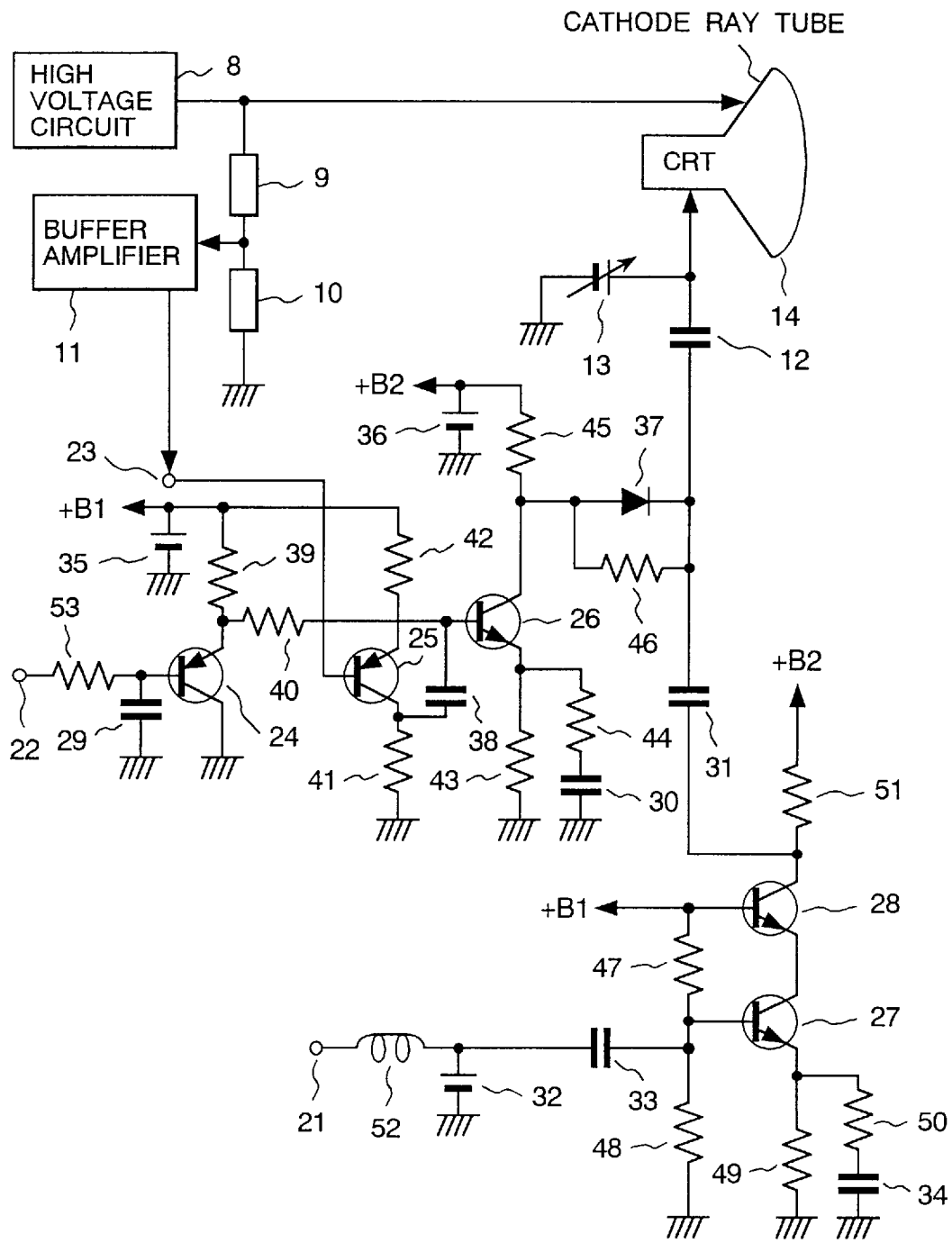
FIG. 2 is a drawing showing a concrete circuit constitution of the first embodiment.
Figure 7:
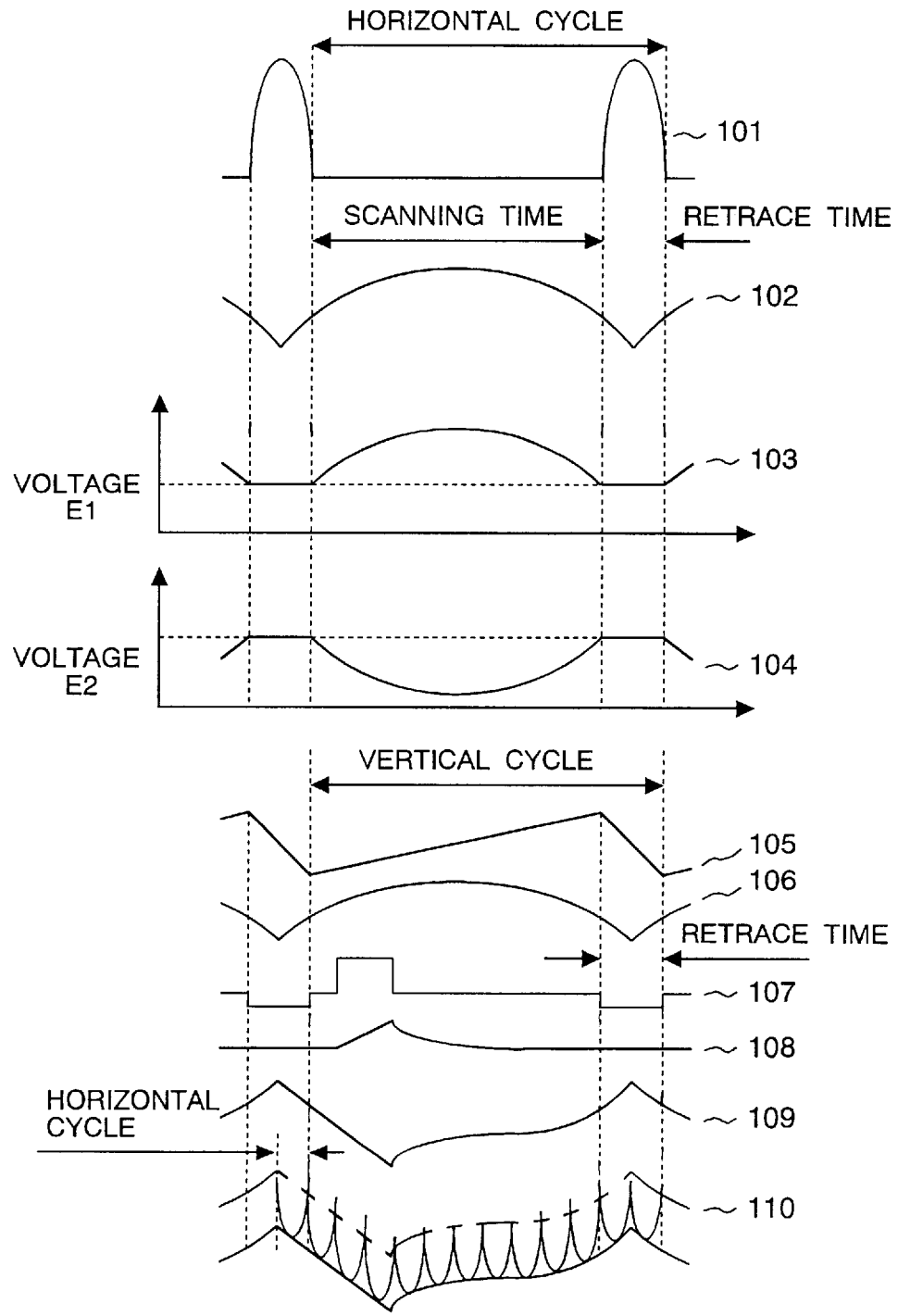
FIG. 7 is a drawing showing an operation of the embodiments.

A concrete circuit constitution example of the dynamic focus circuit 1 is shown in FIG. 2. The operation waveform of each unit of the dynamic focus circuit 1 is shown in FIG. 7. The dynamic focus circuit 1 will be explained concretely hereunder by referring to FIGS. 2 and 7.

Figure 6:
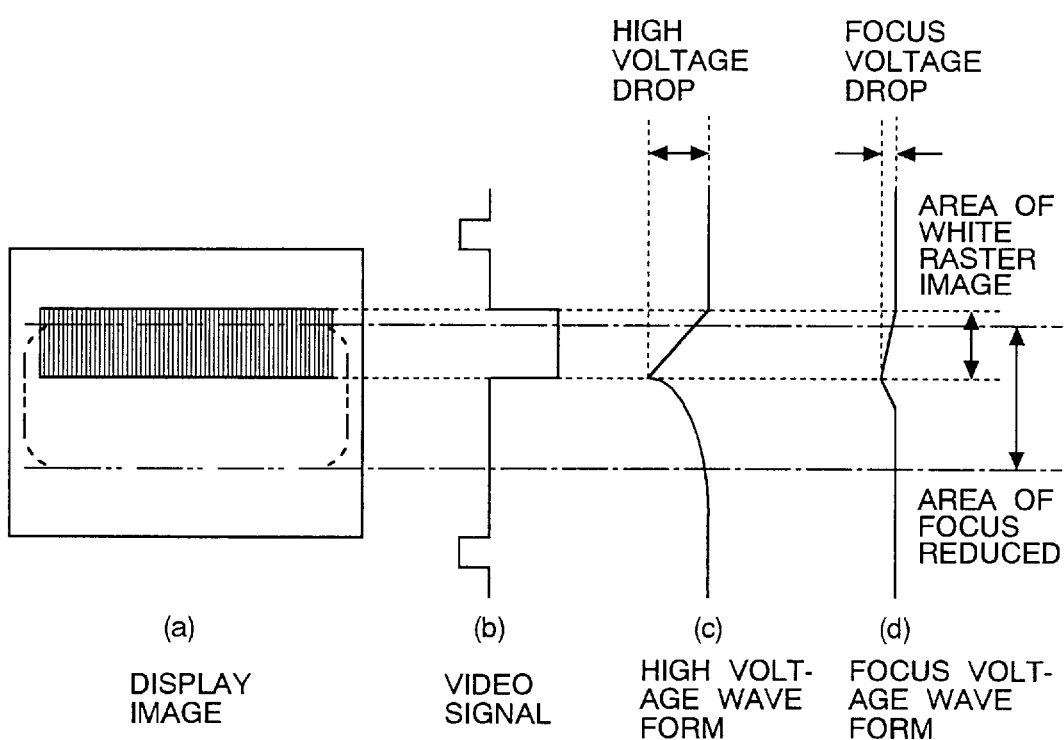
FIG. 6 is a drawing showing an operation of a conventional example.

In FIG. 2, a terminal 21 is an input terminal of a horizontal pulse and inputs a waveform 101 shown in FIG. 7. The waveform 101 is integrated in second order by a coil 52 and a capacitor 32 and a horizontal parabolic waveform 102 shown in FIG. 7 is obtained. The waveform 102 is added to the base terminal of a transistor 27 which is DC-biased by a power source 35 (voltage B1) and resistors 47 and 48 via a capacitor 33. The base terminal of a transistor 28 is connected to the power source 35 and the transistors 27 and 28 constitute an amplifier of cascode type. Resistors 49 and 50 and a capacitor 34 are connected to the emitter terminal of the transistor 27, and the collector of the transistor 28 is connected to a power source 36 (voltage B2) via a resistor 51, and a reverse waveform which is obtained by amplifying the waveform 102 by the gain decided by the resistors 49, 50, and 51 is obtained at the collector terminal of the transistor 28. On the other hand, a terminal 22 is an input terminal for a vertical saw tooth wave and inputs a waveform 105 shown in FIG. 7. The waveform 105 is integrated by a resistor 53 and a capacitor 29 and a vertical parabolic waveform 106 is obtained and added to the base terminal of a transistor 24. The transistor 24 constitutes an emitter follower using a resistor 39 and the waveform 106 is converted to a low impedance and added to the base terminal of a transistor 26 via a resistor 40. The output of the high voltage circuit 8 is added to the anode terminal of the cathode ray tube 14, divided by the voltage dividing elements 9 and 10 at the same time, and added to a terminal 23 via the buffer amplifier 11. The terminal 23 is the input terminal of the adder 4 shown in FIG. 1 and inputted to the base terminal of a transistor 25. When the signal waveform (same as a waveform 107 shown in FIG. 7) shown in FIG. 6(b) is inputted and the image shown in FIG. 6(a) is displayed, the voltage waveform of the high voltage circuit 8 becomes the high voltage waveform shown in FIG. 6(c) and is amplified by the buffer amplifier 11 and a waveform 108 shown in FIG. 7 is obtained. The waveform 108 is inputted to the base terminal of the transistor 26 via a capacitor 38. The transistor 26, resistors 43 to 45, and a capacitor 30 constitute an amplifier of emitter grounding type and a reverse addition waveform 109 is obtained at the collector terminal of the transistor 26. A diode 37, a resistor 46, and a capacitor 31 constitute a clamp circuit, and a signal at the collector terminal of the transistor 28 can be clamped by a signal at the collector terminal of the transistor 26, and a waveform 110 can be added to the focus terminal of the cathode ray tube 14 via the coupling capacitor 12. The waveform 110 is an AC component and a power source 13 is a DC voltage source to the focus terminal. In this way, correction for the focus terminal according to high voltage fluctuation is made possible.

Figure 3:
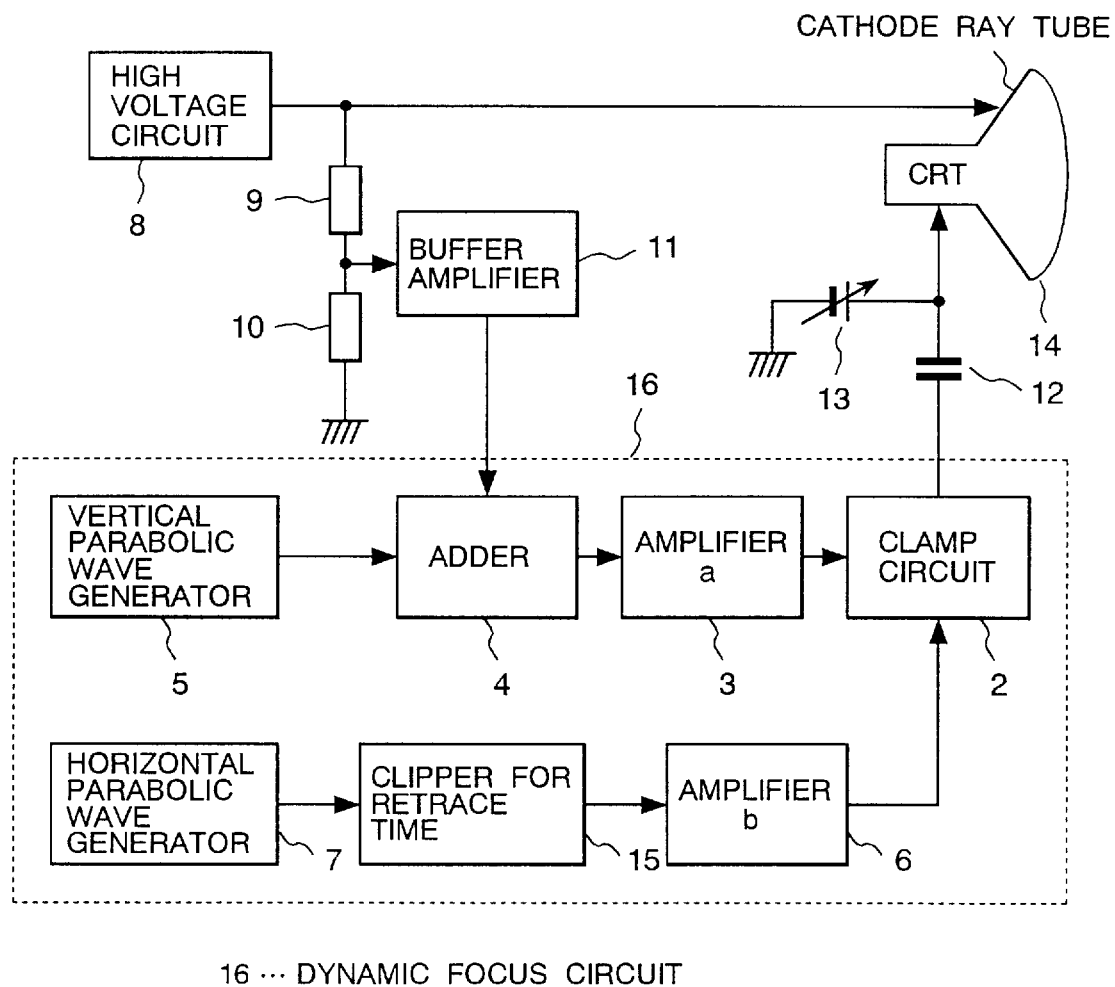
FIG. 3 is a block diagram showing a display device which is a second embodiment of the present invention.

Next, the second embodiment of the present invention will be explained by referring to FIG. 3. FIG. 3 is a drawing showing an example that the present invention is applied to a display device of cathode ray tube. In FIG. 3, each same component uses the same numeral as that shown in FIG. 1.

In FIG. 3, a dynamic focus circuit 16 comprises the clamp circuit 2, the amplifier A 3, the adder 4, the vertical parabolic wave generator 5, the amplifier B 6, the horizontal parabolic wave generator 7, and a clipper for retrace time 15. The output of the dynamic focus circuit 16 is supplied to the DC voltage circuit 13 connected to the focus electrode of a cathode ray tube (CRT) 14 via the coupling capacitor 12 and the voltage of the high voltage circuit 8 connected to the anode terminal of the cathode ray tube 14 is divided by the voltage dividing elements (for example, resistors) 9 and 10, converted to a signal via the buffer amplifier 11, and added to a signal of the vertical parabolic wave generator 5 by the adder. An electron beam can be focused best at all positions on the screen of the cathode ray tube 14.

Figure 4:
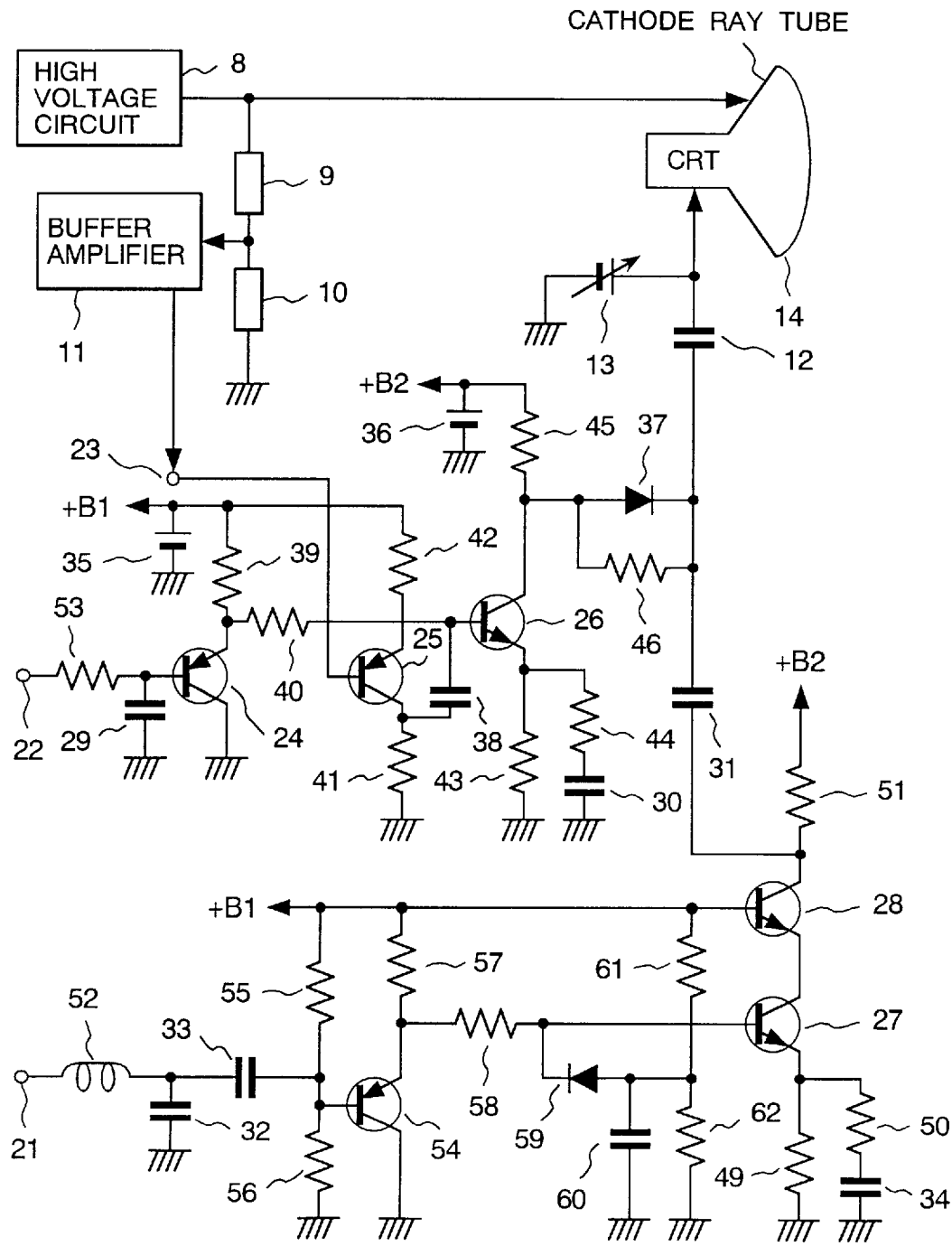
FIG. 4 is a drawing showing a first concrete circuit constitution of the second embodiment.

A concrete circuit constitution example of the dynamic focus circuit 16 is shown in FIG. 4. The operation waveform of each unit of the dynamic focus circuit 16 is shown in FIG. 7. The dynamic focus circuit 16 will be explained concretely hereunder by referring to FIGS. 4 and 7. In FIG. 4, each same function element as that shown in FIG. 2 is indicated by the same numeral.

In FIG. 4, the terminal 21 is an input terminal of a horizontal pulse and inputs the waveform 101 shown in FIG. 7. The waveform 101 is integrated in second order by the coil 52 and the capacitor 32, inputted to the base terminal of a transistor 54 which is DC-biased by resistors 55 and 56 via the capacitor 33, and converted to an impedance at the emitter terminal and the horizontal parabolic waveform 102 shown in FIG. 7 is obtained. The waveform 102 is inputted to the base terminal of the transistor 27 via a resistor 58 and a waveform 103 is obtained at the base terminal of the transistor 27 by a clip circuit comprising resistors 61 and 62, a diode 59, and a capacitor 60. Setting of a voltage (E1) to be clipped can be almost decided by the resistors 61 and 62. The transistors 27 and 28 constitute an amplifier of cascode type. The resistors 49 and 50 and the capacitor 34 are connected to the emitter terminal of the transistor 27, and the collector of the transistor 28 is connected to the power source 36 (voltage B2) via the resistor 51, and a reverse waveform which is obtained by amplifying the waveform 103 by the gain decided by the resistors 49, 50, and 51 is obtained at the collector terminal of the transistor 28. The operation of the signal processing circuit inputted from the terminals 22 and 23 is the same as that described in the first embodiment, so that the explanation thereof will be omitted.

By use of this circuit constitution, the voltage during the horizontal retrace time can be clipped, so that an unnecessary voltage margin can be deleted. Therefore, the output amplitude of the cascode amplifier comprising the transistors 27 and 28 can be made larger compared with that described in the first embodiment.

Figure 5:
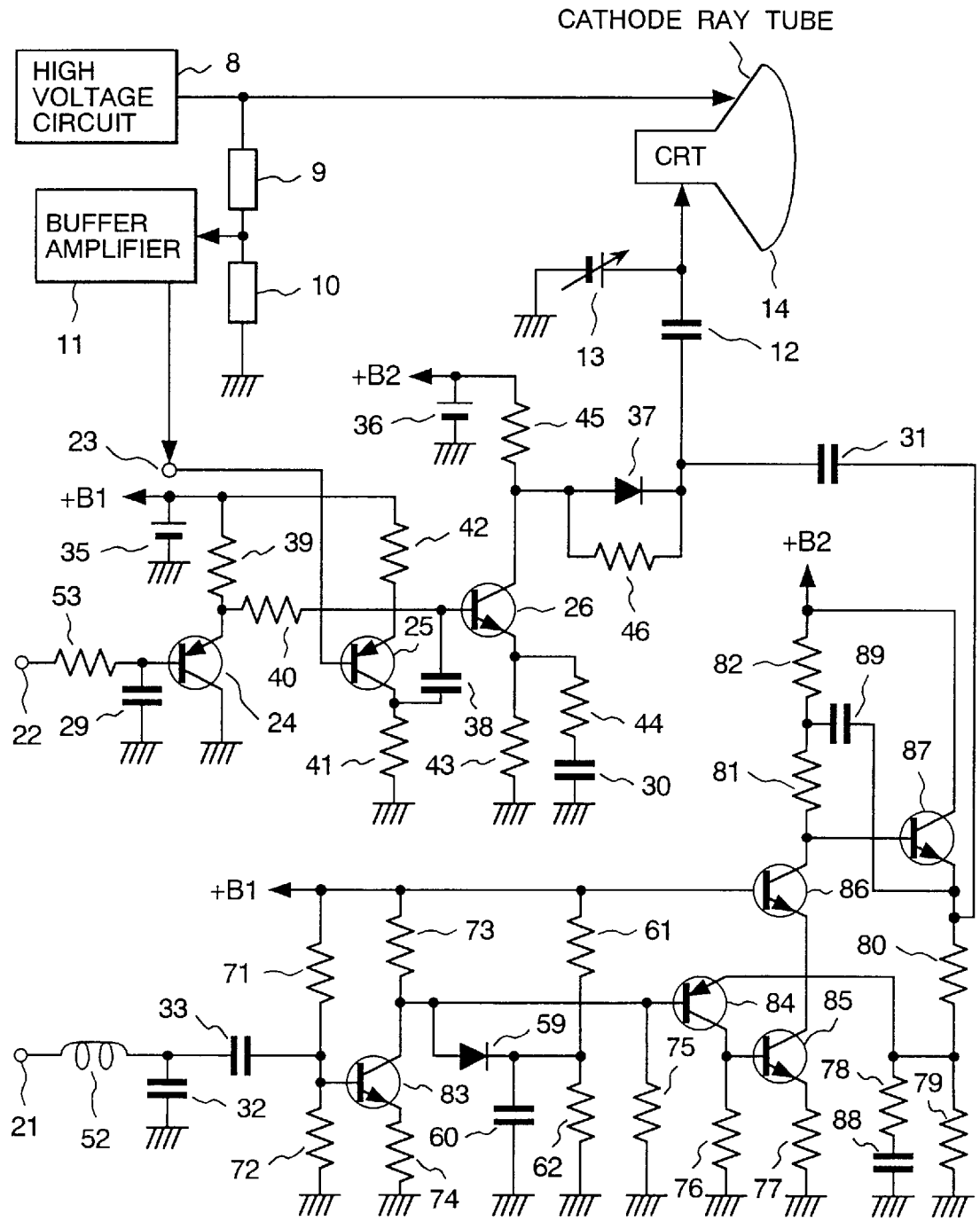
FIG. 5 drawing showing a second concrete circuit constitution of the second embodiment.

Next, another concrete circuit constitution example of the dynamic focus circuit 16 in the second embodiment of the present invention is shown in FIG. 5. The operation waveform of each unit of the dynamic focus circuit 16 is shown in FIG. 7. The dynamic focus circuit 16 will be explained concretely hereunder by referring to FIGS. 5 and 7. In FIG. 5, each same function element as that shown in FIGS. 2 and 4 is indicated by the same numeral.

In FIG. 5, the terminal 21 is an input terminal of a horizontal pulse and inputs the waveform 101 shown in FIG. 7. The waveform 101 is integrated in second order by the coil 52 and the capacitor 32 and the waveform 102 is obtained, inputted to the base terminal of a transistor 83 which is DC-biased by resistors 71 and 72 via the capacitor 33, reversed and amplified at the collector terminal, and inputted to the base terminal of a transistor 84. A waveform 104 is obtained at the base terminal of the transistor 84 by the clip circuit comprising the resistors 61 and 62, the diode 59, and the capacitor 60. Setting of a voltage (E2) to be clipped can be almost decided by the resistors 61 and 62.

The transistors 84 to 87 constitute an amplifier and the operation thereof will be explained hereunder. The waveform 104 inputted to the base terminal of the transistor 84 is signal-reversed and added to the base terminal of the transistor 85. The transistors 85 and 86 constitute an amplifier of cascode type and the waveform is reversed and amplified at the collector terminal of the transistor 86 and outputted to the capacitor 31 via an emitter follower 87. Resistors 79 and 80 are connected to the emitter terminal of the transistor 87 and when the emitter terminal of the transistor 84 is connected to the voltage dividing point thereof, a DC negative feedback operation is performed. Namely, the amplifier operates so that the emitter potential of the transistor 87 rises, and the collector current of the transistor 84 increases, and the base potential of the transistor 85 rises, and the collector potential of the transistor 86 lowers, and the emitter potential of the transistor 87 lowers. In this case, resistors 81 and 82 which are load resistors of the transistor 86 can be set to large values and low power consumption can be realized. Furthermore, by use of the transistor 87, low impedance driving is made possible. The gain of this amplifier is decided by the ratio of the resistor 80 and the series-parallel element (element comprising the resistors 78 and 79 and a capacitor 88). Therefore, the DC gain can be decided by the ratio of the resistors 80 and 79, and the AC gain can be decided by the ratio of the resistors 80 and 78, and the gain in a high frequency area can be increased, and a satisfactory frequency characteristic can be obtained. Furthermore, when a capacitor 89 is connected to the voltage dividing point of the resistors 81 and 82 from the emitter terminal of the transistor 87, the slewing rate in a large amplitude operation is improved.

As an example of the circuit constants in this circuit, when the resistors 82, 81, 80, 79, and 78 are set to 440 k$\Omega$, 220 k$\Omega$, 660 k$\Omega$, 15 k$\Omega$, and 4.7 k$\Omega$ and the capacitors 88 and 89 are set to 100 $\mu$F and 0.47 $\mu$F respectively, an output voltage amplitude of 900 Vpp is obtained at a supply voltage (B2) of 1050 V and a low power consumption of 1.8 W can be realized at the same time.

In the aforementioned embodiment, the constitution of the small signal processing portion, that is, the horizontal and vertical parabolic waveforms is also described. However, there are various means other than is available and they can be combined properly. In the aforementioned embodiment, the capacitor 89 is not always necessary. However, when the constants described in the aforementioned embodiment are used and the output amplitude is more than about 600 Vpp, the capacitor 89 produces an extremely large effect in improvement of the slewing rate.

The operation of the signal processing circuit inputted from the terminals 22 and 23 is the same as that described in the first embodiment, so that the explanation thereof will be omitted.

By use of this circuit constitution, the voltage during the horizontal retrace time can be clipped, so that an unnecessary voltage margin can be deleted. The amplifier comprising the transistors 84 to 87 has an excellent frequency characteristic and a voltage waveform with a large amplitude can be obtained.

According to the present invention, high voltage fluctuation can be superimposed and corrected on the focus voltage and the best focus status can be always realized regardless of details of an image displayed on the screen. Furthermore, since the dynamic focus voltage can be clipped during the retrace time, there is no need to amplify the voltage unnecessarily and the efficiency is excellent. 90% of the supply voltage can be obtained as a dynamic focus output voltage, and the loss of the circuit is little, and an extremely low power consumption can be realized.

The invention claimed is:

1. A display device comprising:
   a deflection device for generating a magnetic field for deflecting an electron beam in the horizontal or vertical direction;
   a cathode ray tube device having a terminal for controlling a focusing electric field for focusing an electron beam;
   a high voltage circuit for supplying a high voltage to said cathode ray tube device;
   a dynamic focus circuit for controlling the focusing electric field according to the deflection position of an electron beam;
   means for detecting a high voltage fluctuation of said high voltage circuit and creating a high voltage fluctuation detection waveform;
   a circuit for generating a waveform of horizontal cycle in said dynamic focus circuit;

a first amplifier for amplifying said waveform of horizontal cycle;

a circuit for generating a waveform of vertical cycle;

an adder for synthesizing said waveform of vertical cycle and said high voltage fluctuation detection waveform;

a second amplifier for amplifying a waveform of said adder; and a circuit for clamping said waveform of said first amplifier with said waveform of said second amplifier.

2. A display device according to claim 1, wherein said first amplifier has a cascode amplifier of a first transistor of base grounding type and a second transistor of emitter grounding type and said second amplifier has an amplifier of a third transistor of emitter grounding type.

3. A display device comprising:

a deflection device for generating a magnetic field for deflecting an electron beam in the horizontal or vertical direction;

a cathode ray tube device having a terminal for controlling a focusing electric field for focusing an electron beam;

a high voltage circuit for supplying a high voltage to said cathode ray tube device;

a dynamic focus circuit for controlling the focusing electric field according to the deflection position of an electron beam;

means for detecting a high voltage fluctuation of said high voltage circuit and creating a high voltage fluctuation detection waveform;

a circuit for generating a waveform of horizontal cycle in said dynamic focus circuit;

a clipper for clipping said waveform of horizontal cycle;

a first amplifier for amplifying said waveform of horizontal cycle;

a circuit for generating a waveform of vertical cycle;

an adder for synthesizing said waveform of vertical cycle and said high voltage fluctuation detection waveform;

a second amplifier for amplifying a waveform of said adder; and a circuit for clamping a waveform of said first amplifier with said waveform of said second amplifier.

4. A display device according to claim 3, wherein said first amplifier has a cascode amplifier of a first transistor of base grounding type and a second transistor of emitter grounding type and said second amplifier has an amplifier of a third transistor of emitter grounding type.

5. A display device according to claim 3, wherein said first amplifier has a cascode amplifier of a first transistor of base grounding type and a second transistor of emitter grounding type, further comprising:

a fourth transistor of emitter follower type connected to the collector terminal of said first transistor;

a first resistor and a second resistor connected to the emitter terminal of said fourth transistor in series for voltage division;

the emitter terminal of a fifth transistor connected to the joint of said first resistor and said second resistor and the collector terminal of said fifth transistor which are connected to the base terminal of said second transistor;

a third resistor and a fourth resistor connected to a power source in series from the collector terminal of said first transistor; and a capacitor connected between the emitter terminal of said fourth transistor and the joint of said third resistor and said fourth resistor;

wherein the base terminal of said fifth transistor is the input terminal of said dynamic focus circuit.

* * * * *